May 22, 1951          H. S. MARX          2,554,371
CLEARANCE DETECTOR SWITCH FOR MOTOR TRUCKS
Filed June 21, 1948
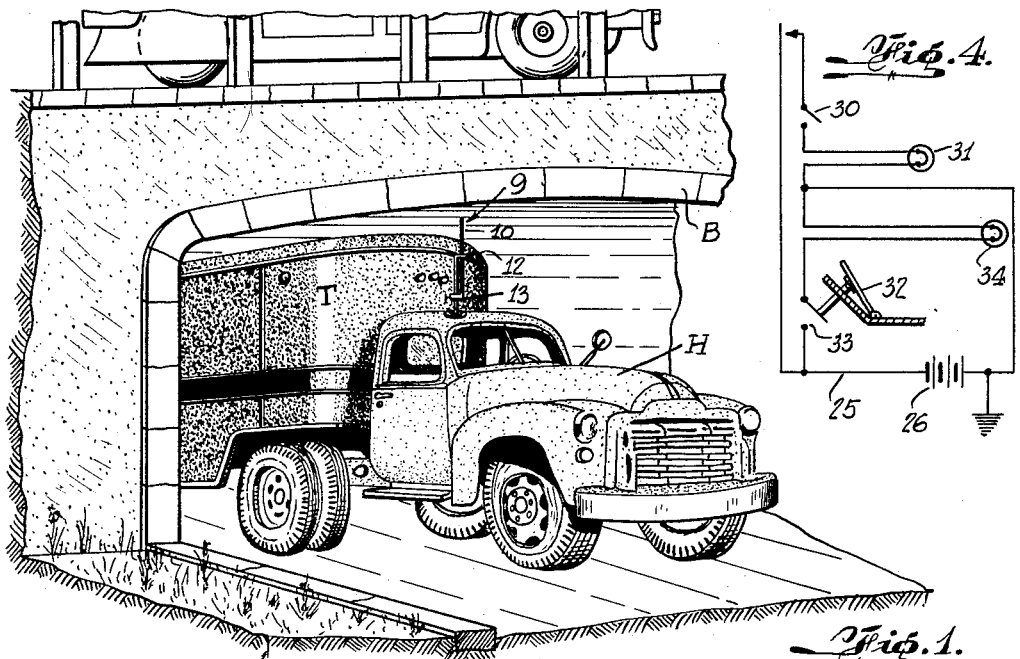
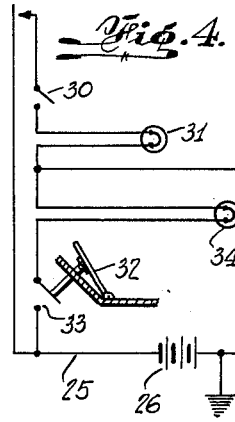
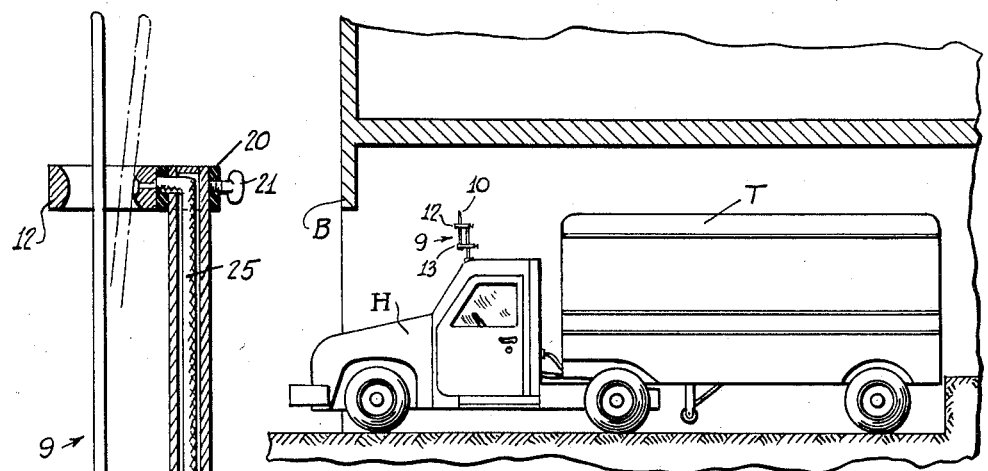
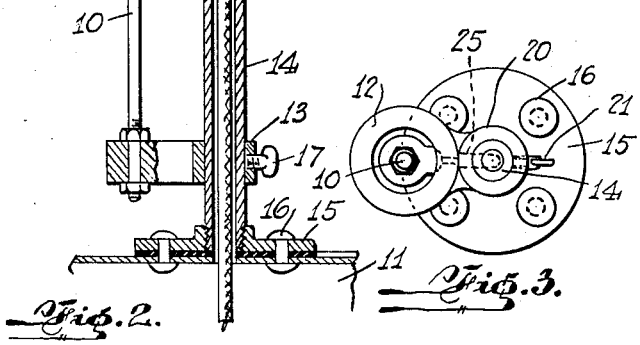
INVENTOR.
HENRY S. MARX.
BY *Derek Freeman*
ATTORNEY.

Patented May 22, 1951

2,554,371

UNITED STATES PATENT OFFICE 2,554,371

CLEARANCE DETECTOR SWITCH FOR MOTOR TRUCKS

Henry S. Marx, New York, N. Y.

Application June 21, 1948, Serial No. 34,273

1 Claim. (Cl. 200—52)

This invention relates to a telltale for motor trucks and especially trailer trucks to provide an automatic warning of overhead obstructions.

Among the hazards of trailer truck transportation is the danger of driving the trailer and more particularly the roof of its body into contact with an overhead obstruction such as an overhead bridge. Even in cases where overhead clearances are made known to the public, such as clearances between a highway and a trestle crossing the highway, such clearances are not always constant as when the highway is covered with thick layers of ice or snow. There are occasions when the truck driver himself does not precisely know the overall height of his trailer, as where for example, the trailer is laden with a load which extends above the top of the trailer, reference being here made to trucks or trailers having open bodies. Even closed body trucking trailers which are normally estimated to have a given overall height, nonetheless vary in height under different circumstances. By way of illustration, a heavily laden trailer may back into a warehouse with perhaps one or two inches of clearance between the roof of the trailer body and an overhead lintel or overhanging door. After the truck is unloaded, however, it may be found to have gained perhaps three or four inches in height due to removal of the load on the tires and springs, thus rendering it impossible in this particular case to leave the warehouse without deflating the tires or in some other way providing necessary clearance between the top of the truck and the overhanging door or the lintel.

It is accordingly the principal object of this invention to provide a telltale which automatically warns of insufficient clearance between the top of the trailer and an overhead obstruction. Although the present description will deal primarily with a telltale for overhead obstructions, it will be understood that the very same device, installed on the sides of the trailer will adequately warn of insufficient side clearance.

Another object of this invention is the provision of a telltale of the character described which automatically warns drivers behind the trailer in which it is installed of insufficient clearance between the advance trailer and overhead or other obstructions, thereby serving ample notice upon following drivers that the driver of the forward trailer and its tractor will apply his brakes to stop the trailer in the shortest possible distance.

Still another object of this invention is the provision of a telltale of the character described which automatically applies the brakes of the trailer on which it is installed when insufficient clearance exists between the trailer and overhead or other obstruction.

A further object of this invention is the provision of a telltale of the character described which is manually adjustable to given or selected heights and which may also serve as a guide in keeping the loads of open top trucks within safe clearance limits.

A preferred form of this invention is shown in the accompanying drawing, in which:

Fig. 1 is a perspective view of a trailer truck on which the telltale herein claimed is installed, said truck being shown passing under a trestle.

Fig. 2 is a vertical section through the telltale shown installed on said truck.

Fig. 3 is a top view thereof.

Fig. 4 is a diagrammatic view of the circuit of said telltale.

Fig. 5 is a side view of a trailer truck having the telltale herein claimed mounted thereon, said truck being shown at an indoor loading platform.

The telltale herein claimed comprises a contact rod 10 which is adjustably positionable with respect to a given part of tractor H, a contact ring 12 which encircles said contact rod and an electric circuit which connects said contact members with a suitable signal device. Contact rod 10 is shown in Fig. 2 to be supported by means of a slidably mounted bracket 13 which is itself supported on a post 14. Post 14 is affixed to the roof of the cab of tractor H by means of a flanged base 15 and a plurality of rivets 16 or similar fastening members. The front of the roof of the cab is a suitable place for fastening the flanged base 15 and hence the contact rod 10, for the reason that the front of the roof of the cab is separated from the front end of the trailer by a distance of perhaps eight, ten or even twelve feet. It is most desirable for obvious reasons that the telltale be positioned as far forward of the trailer as is practicable.

It has been stated that contact rod 10 is mounted on bracket 13 which is slidably mounted on post 14. When the telltale is used in connection with overhead obstructions, it will be appreciated that both post 14 and the contact rod 10 will extend vertically of the truck. Since bracket 13 is slidably movable on post 14 it will be apparent that contact rod 10 is vertically adjustable with respect to that part of the truck on which the device is mounted. A thumb screw 17 is provided in bracket 13 to engage post 14 for fixing said bracket in any given position on said post. Contact ring 12 is fixedly mounted on the top of post 14 by means of a collar 20 on said post and a thumb screw 21 in said collar which engages said post.

In addition to serving as a support for the contact rod and the contact ring, post 14 serves as a conduit for conductor 25 which is connected at its top end to contact ring 12 and at its opposite end to a source of electric current 26 shown on Fig. 4. This source of electric current is, of course, the storage battery of the truck. It will be noted in Fig. 2 that ring 12 is insulated by means of collar 20 from post 14, the ring being made of electrically conductive material and forming part of the circuit shown in Fig. 4. Contact rod 10 is also made of electrically conductive material and it too forms part of said circuit. The arrow in Fig. 4 is intended to represent said contact rod schematically. Contact rod 10 may be grounded to the metal framework of the truck. In addition to being electrically conductive said contact rod must be provided with a certain degree of resilience and elasticity. It should be sufficiently springy to bend without breaking until it makes contact with contact ring 12 and thereby closes the circuit which will hereinafter more fully be described and which is shown in Fig. 4. Once released, it should be able to spring back to its normal condition, out of contact with the ring.

Reference to Fig. 4 will show that a manually operable switch 30 is incorporated into the circuit. This switch is normally open to prevent false alarms, so to speak, when the telltale encounters such harmless objects as overhanging tree branches. The switch is closed by the truck driver when it appears that a trestle or other overhanging obstruction of uncertain or inadequate clearance is about to be encountered.

A signaling device 31 which may be a visual device such as a red light, or a sound-producing device, such as an electric buzzer is incorporated into the circuit. Hence when switch 30 is closed and contact rod encounters an obstruction which bends it over into contact with ring 12, the signaling device 31 is energized. The truck driver applies his brakes in sufficient time to prevent the truck body or the truck trailer from hitting the overhead obstruction. When brake pedal 32 is depressed to stop the truck, switch 33 is caused to close thereby closing the circuit to stop light 34 and giving ample warning to drivers behind the truck.

It has above been indicated that the telltale herein claimed may be employed to energize a signaling device or both a signaling device and stop light of the truck and/or the brakes themselves. There is no need to show the several circuits which these several arrangements would require since in each case the circuit is conventional. It is important to know, however, that the telltale may, if desired, be used to deliver a warning to the driver of the truck on which it is installed or a warning to the driver behind said truck and if desired to deliver both said warnings and at the same time to automatically stop the truck and thereby prevent it from running into the obstruction in question. The construction of the telltale remains the same in all cases and the sole difference is in the elements which are included in the circuit controlled by the telltale.

It will be appreciated that the foregoing is descriptive of a preferred embodiment of this invention and that modifications may be incorporated therein within the broad scope of the invention. These modifications will be apparent to those skilled in the art, and they include such changes in the structure of the device herein claimed as a change in the manner of mounting either the ring or the contact bar or both. Another illustration of the modifications of which the present device is susceptible relates to the shape of contact ring 12. This contact member may assume other shapes, the principal criterion being that it be engageable by the contact rod when said rod is bent or moved over by an encountered obstruction.

Having thus described my invention, what I claim as new and desire to secure by Letters Patent is:

A circuit closing means for a clearance detector telltale of the character described comprising a hollow vertically extending post mounted at the top of the forward end of a trailer truck cab, a contact ring of electrically conductive material mounted at the top end of said post, an electrical conductor extending through said hollow post and being in electrical contact with said ring, an insulating collar between the hollow post and said ring, a bracket slidably mounted on said post below said ring, clamping means for fixedly positioning said bracket on said post, a vertically extending contact rod mounted on said bracket for movement through said ring, said contact rod being normally out of engagement with said ring, said contact rod being of electrically conductive spring material which enables said rod to bend into contact with the ring to close the circuit when the rod encounters an obstruction.

HENRY S. MARX.

REFERENCES CITED

The following references are of record in the file of this patent:

UNITED STATES PATENTS

| Number | Name | Date |
|---|---|---|
| 1,936,828 | Clement et al. | Nov. 28, 1933 |
| 2,144,286 | Dawson | Jan. 17, 1939 |
| 2,208,697 | Kernodle et al. | July 23, 1940 |
| 2,214,685 | Stone, Jr. | Sept. 10, 1940 |
| 2,221,330 | Schneider | Nov. 12, 1940 |
| 2,258,334 | Miller | Oct. 7, 1941 |
| 2,259,614 | Chang | Oct. 21, 1941 |
| 2,440,587 | Krall | Apr. 27, 1948 |
| 2,482,630 | Mastomarino | Sept. 20, 1949 |